United States Patent [19]
Banyas et al.

[11] 3,858,709
[45] Jan. 7, 1975

[54] CONTAINER HANDLING APPARATUS

[75] Inventors: John D. Banyas, Toledo; Frederick L. Wallington, Perrysburg, both of Ohio

[73] Assignee: Owens-Illinois Inc., Toledo, Ohio

[22] Filed: July 11, 1973

[21] Appl. No.: 378,382

Related U.S. Application Data

[62] Division of Ser. No. 154,038, June 17, 1971, , Division of Ser. No. 24,173, March 31, 1970, Pat. No. 3,637,074.

[52] U.S. Cl. ............................... 198/20 R, 198/179
[51] Int. Cl. ............................................ B65g 47/61
[58] Field of Search............ 198/20, 179; 294/64 R, 294/87 R, 99 R; 214/1 BA, 1 BS, 309, 85 D

[56] References Cited
UNITED STATES PATENTS
3,198,348  8/1965  Cummings ...................... 294/64 R
3,302,803  2/1967  Mooney ............................ 198/20

*Primary Examiner*—Richard A. Schacher
*Assistant Examiner*—Jeffrey V. Nase
*Attorney, Agent, or Firm*—J. R. Nelson

[57] ABSTRACT

Apparatus for handling and transferring bulb-shaped glass containers from one station in a container production line to another. A series of container handling vacuum chucks are linked together into an endless chain to pick glass containers in succession up from a first conveyor and to deposit the containers on a second conveyor. A control valve mounted on each chuck normally supplies the chuck with vacuum, however the control valve is actuated at the container discharge station, and may also be actuated at a reject station to supply air under pressure to the chuck to eject the container.

7 Claims, 9 Drawing Figures

CONTAINER HANDLING APPARATUS

REFERENCE TO RELATED APPLICATION

This application is a division of application Ser. No. 154,038 filed June 17, 1971 which is a division of application Ser. No. 24,173 filed Mar. 31, 1970 and now U.S. Pat. No. 3,637,074.

SUMMARY OF THE INVENTION

The container handling apparatus of the present invention is employed in a production line for producing composite containers of the type shown in U.S. Pat. No. 3,372,826. These containers consist of a bulb-shaped glass container having a hemispherical bottom and a cup-shaped plastic base element fitted into and bonded to the bottom to provide stability to the assembled container. The apparatus of the present invention is employed to receive the bulb-shaped glass containers in an inverted position from a heat-treated conveyor, to subsequently deposit the container in an assembly machine where the plastic base is assembled on the container.

To grip and carry the containers, the apparatus includes a plurality of vacuum chucks linked together into an endless chain for movement along an endless path during which the chucks are successively moved into operative alignment with containers in the infeed conveyor, are manipulated to pick the containers up from the infeed conveyor and to then move into operative alignment with the assembly machine and deposit the containers onto the assembly machine. In view of the relatively high line speed (as many as 600 containers per minute) the vacuum chuck is provided with a control valve which is actuable to supply air under pressure to the chuck to provide a rapid ejection of the container from the chuck either at a reject station or at the discharge station.

Other objects and features of the invention will become apparent by reference to the following specification and to the drawings.

GENERAL DESCRIPTION OF SYSTEM

Figure 1:
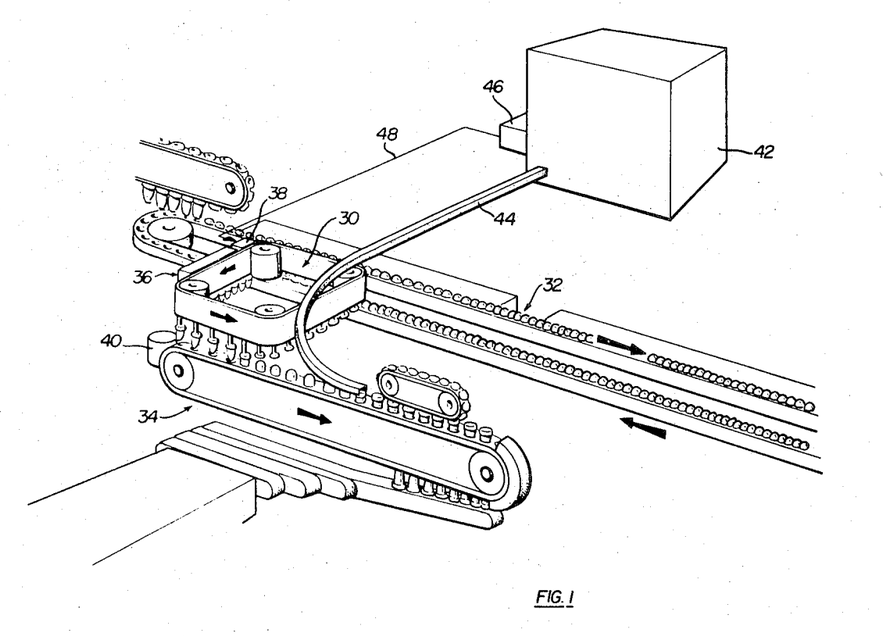
FIG. 1 is an overall perspective view of an installation embodying the present invention.

Referring first to FIG. 1, there is shown a portion of a production line for making and assembling composite containers of the type shown in U.S. Pat. No. 3,372,826. These composite containers consist of a bulb-shaped glass container having a hemispherical bottom and a cup-shaped plastic base element which is fitted onto and bonded to the glass container bottom to provide a stable support for the container.

The function of the machine 30, to which the present application is directed, is to transfer the glass containers from a heat-treat conveyor designated generally 32 in FIG. 1 to an assembly machine 34, upon which the plastic base elements are assembled onto the glass container. Assembly machine 34 is the subject of a copending application of James D. Mallory et al., Ser. No. 883,515, filed Dec. 9, 1969 and now U.S. Pat. No. 3,630,797 and assigned to the assignee of the present application.

During the transfer of the containers from conveyor 32 to assembly machine 34, the containers are sprayed with a coating to improve the scratch resistance and lubricity of the container. This coating is applied as the container is conveyed by machine 30 through a spray tunnel designated generally 36. Before its passage through tunnel 36 the container is subjected to a sidewall and finish inspection and substandard containers are automatically rejected at a reject station designated generally 38 and drop into a cullet chute 40.

The reject station may be operated to reject all containers passing through machine 30. One of many examples of situations where it might be wanted to reject all containers would be in the event that the supply of plastic bases which are to be assembled on the containers at assembly machine 34 is depleted. The plastic bases are supplied from a schematically illustrated base supply source 42 via a chute 44 to assembly machine 34. A suitable detector 46 on base supply source 42 is operatively connected by a control coupling schematically illustrated at 48 to reject station 38 and operates the reject station, in a manner described in detail in our aforementioned copending application Ser. No. 24,173, to continually reject containers in the event of an inadequate supply of bases.

HEAD ASSEMBLY

Figure 4:
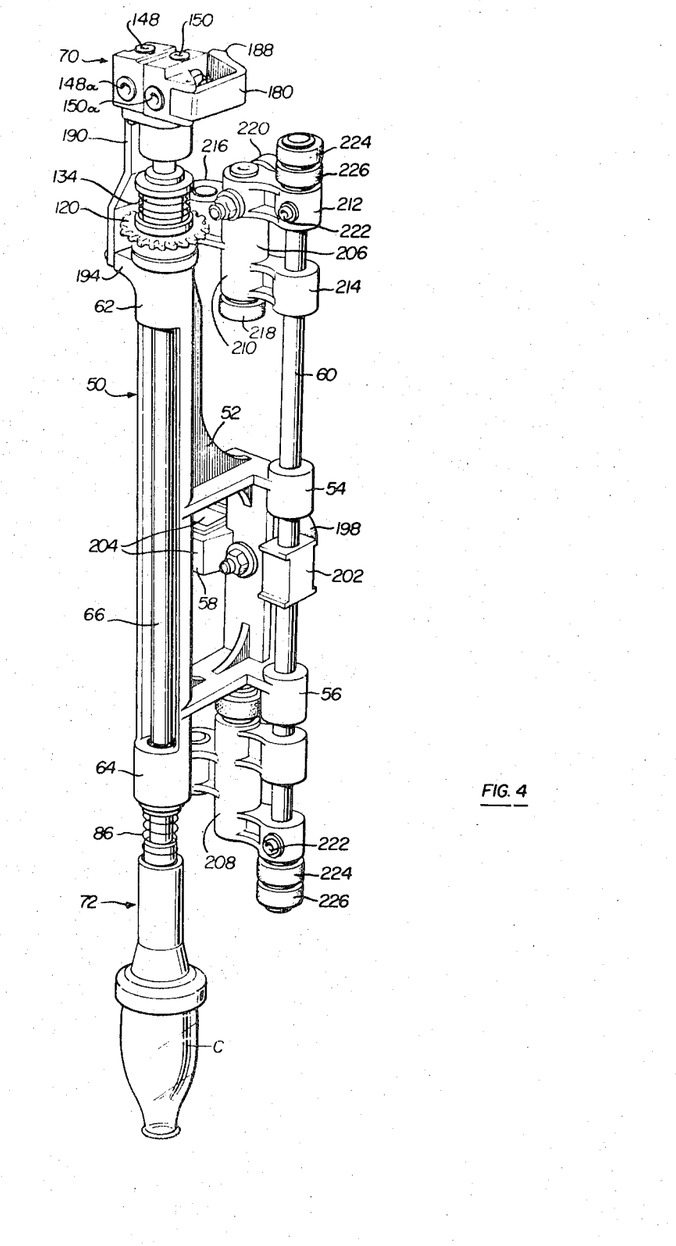
FIG. 4 is a perspective view of a container handling head employed in the apparatus.
Figure 5:
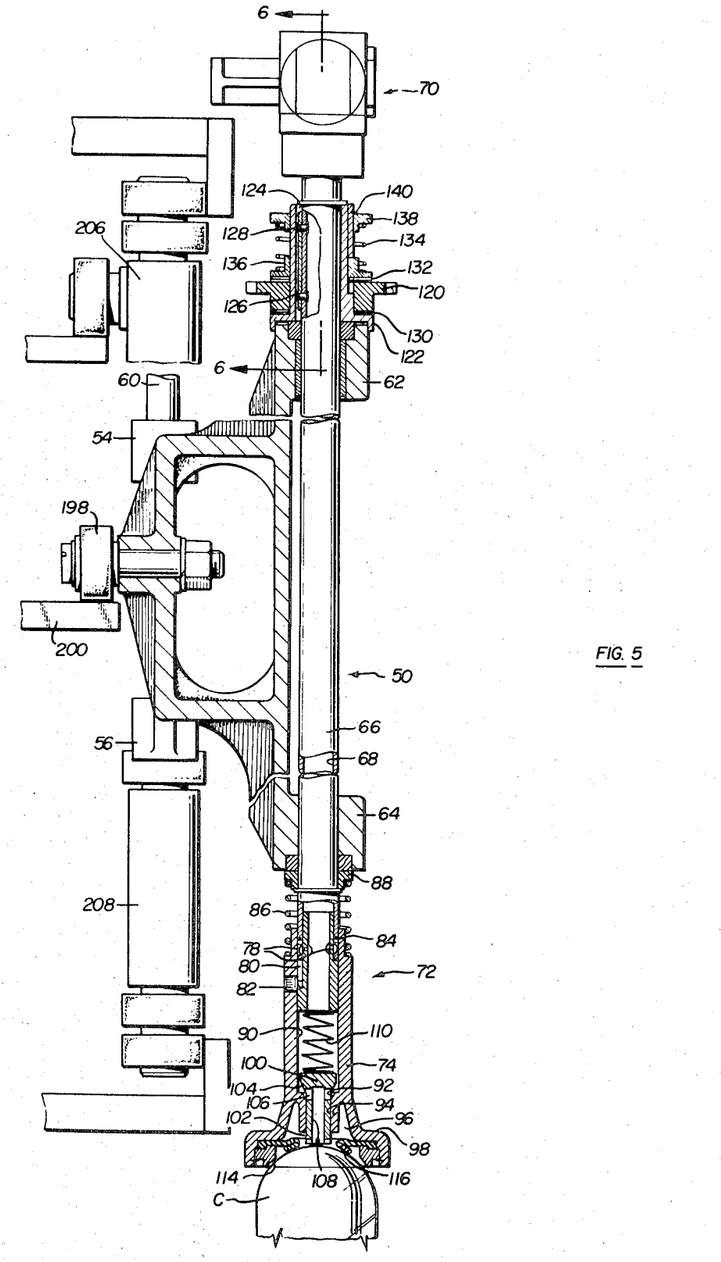
FIG. 5 is a detail cross-sectional view taken on a central vertical plane through the container handling head.
Figure 6:
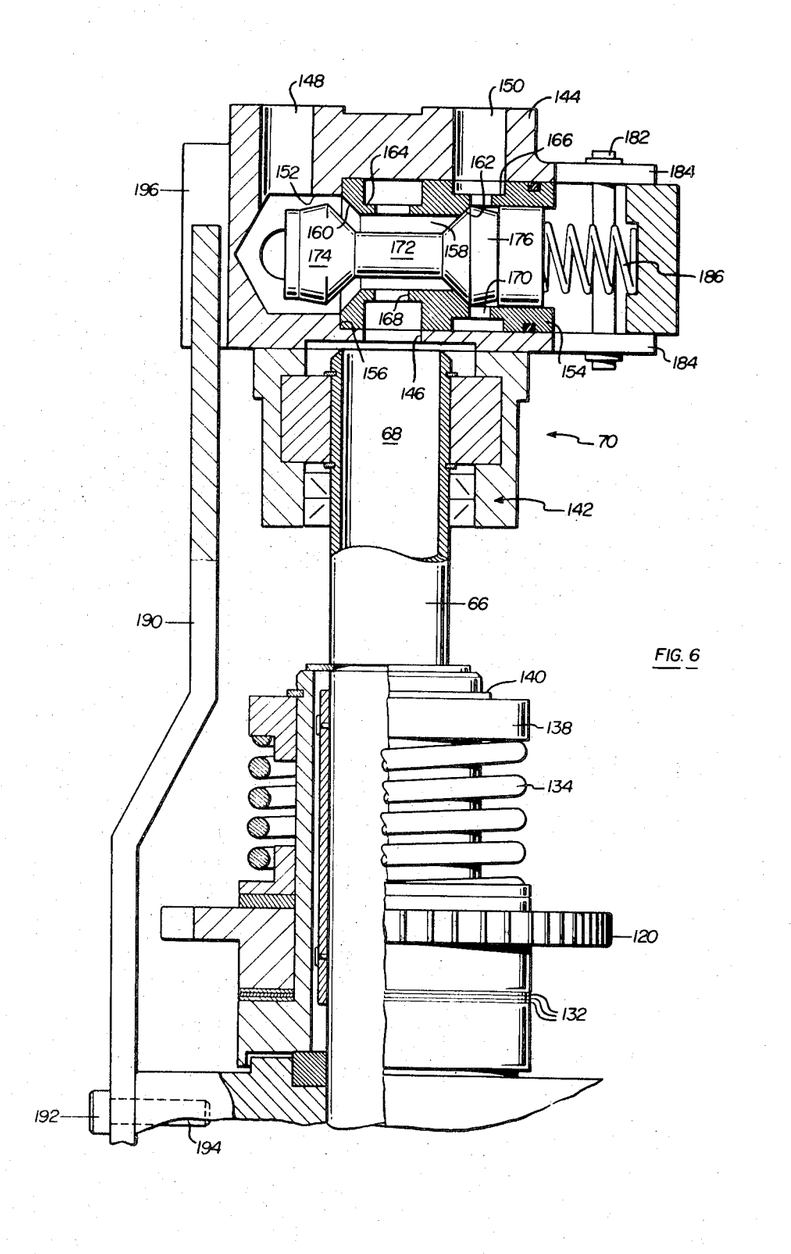
FIG. 6 is a detail cross-sectional view, taken approximately on line 6—6 of FIG. 5, showing details of the chuck control valve.

To transport the containers between conveyor 32 and assembly machine 34, machine 30 employs a plurality of individual head assemblies designated generally 50 which are linked together into an endless chain for movement along a generally rectangular endless path. Details of an individual head assembly 50 are shown in FIGS. 4–6.

Each head assembly 50 includes a support bracket 52 having a pair of vertically spaced front coupling bushings 54, 56 and a rear coupling bushing 58. In linking the head assemblies into an endless chain, vertical rods 60 are passed through the upper and lower coupling bushing 58 of the next adjacent head assembly.

Each bracket 52 also is constructed with vertically spaced upper 62 and lower 64 chuck support bushings which rotatively receive a hollow tubular chuck shaft 66. The hollow interior of shaft 66 defines a conduit 68 which provides fluid communication between a control valve designated generally 70 mounted on the upper end of shaft 66 and a chuck designated generally 72 mounted on the lower ends of shaft 66.

Chuck 72 includes an annular housing 74 which is mounted for axial sliding movement on the lower end of shaft 66 by a structure which includes an adaptor 76 fixedly secured, as by rivets 78, to the lower end of shaft 66 and having an axial extending groove 80 which slidably receives a pin 82 mounted in housing 74 to guide and define end limits of axial movement of housing 74 on lower end of shaft 66. A sliding seal at 84 is provided between shaft 66 and housing 74. Housing 74 is normally maintained at its lower end limit of travel relative to shaft 66 both by gravity and by a biasing spring 86 seated between the upper end of housing 74 and a retainer 88 seated at the lower end of lower coupling bushing 64.

Housing 74 is formed with a central passage 90 having an inwardly tapering valve seat 92 near its lower end. A reduced diameter passage 94 extends axially downwardly from valve seat 92 and opens at its lower end into a recess 96 formed in the interior of an enlarged diameter end portion 98 of housing 74. A valve member having a head 100 also includes a stem 102 which is slidably received within reduced diameter passage 94. Head 100 is formed with a conical surface 104 adapted to seat against valve seat 92. Transverse passages 106 communicate with an axial passage 108 through the stem to place passage 90 in communication with recess 96 when the valve is unseated as shown in FIG. 5. Head 100 is normally biased against seat 92 by a compression spring 110 seated between the valve head and the lower end of adaptor 76.

At the mouth of recess 96, an annular container seat 112 is mounted within housing 74. The container engaging surface of seat 112 surrounds an opening 114 which is of a diameter smaller than the diameter of the bottom of a container C. Inwardly of recess 96 from container seat 112 is mounted an annular seal 116 which, as indicated in FIG. 5, provides a peripheral seal closing chamber 96 from the atmosphere when a container bottom is engaged with seat 112. With the container thus seated, the container bottom engages the lower end of valve stem 102 to elevate the valve head off valve seat 92, thereby placing passage 90 and the interior of shaft 66 in communication with recess 96. When no container is engaged with seat 112, surface 104 of valve head 100 sealingly engages valve seat 92 to block communication between passage 90 and recess 96.

Shaft 66 and chuck 72 may be driven in rotation in bushings 62 and 64 by means of a sprocket 120 mounted on shaft 66 above upper coupling bushing 62. A flanged sleeve 122 is mounted upon shaft 66 and formed with an axial extending key slot 124 which receives a key in the form of a strip of metal 126 riveted to shaft 66 as by rivets 128. Sprocket 120 is made of a molded polyurethane material which acts as a friction surface and is frictionally biased against flanged sleeve 122 by a spring 134 engaged between two flanged hubs 136 and 138. Hub 138 is held against axial movement on sleeve 122 by a keeper ring 140.

Valve 70 is mounted upon the top of shaft 66 for rotation relative to the shaft by a coupling sleeve assembly designated generally 142 which forms a rotary seal with the top of shaft 66. Housing 144 of valve 70 is constructed with an outlet port 146 in direct communication with the internal conduit 68 of shaft 66. At the top of housing 144 a pressure supply port 148 and a vacuum supply port 150 are bored into the housing to communicate with a central passage 152 bored in housing 144. A cartridge sleeve 154 is received within bore 152 and is axially seated at its inner end against a shoulder 156 in passage 152. Cartridge 154 is formed with a central axially extending passage 158 which goes all the way through sleeve 154 and is internally formed with two oppositely facing valve seats 160 and 162. Two annular grooves 164 and 166 extend around the periphery of sleeve 154 and communicate with the central passage 158 via ports 168 and 170 respectively. Auxiliary pressure and vacuum ports 148a and 150a are bored in housing 144 and are in constant communication with the corresponding ports 148 and 150 via the inner end of passage 158 (ports 148 and 148a) and recess 166 (ports 150 and 150a).

A valve member 172 is provided with a pair of oppositely facing valve heads 174 and 176 which are respectively engageable with valve seats 160 and 162.

In FIG. 6, valve 70 is shown in its abnormal or actuated position in which valve head 174 is spaced clear of seat 160 to place port 148 in communication with ports 168 and 146.

Valve 70 is normally maintained in the opposite condition to that shown in FIG. 6 with valve head 174 seated against valve seat 160 and valve head 176 spaced to the right from valve seat 162. In this position, vacuum supplied to port 150 passes through the valve to ports 168 and 146. Air under pressure supplied at pressure supply port 148 acts against the left-hand side of valve head 174 to maintain the valve in the normal position, this action being augmented by the reduced pressure at the right-hand side of valve head 174.

Valve 70 is shifted to the abnormal or actuated position shown in FIG. 6 by a valve actuating arm 180 pivotally mounted upon a pin 182 passing through a pair of lugs 184 integrally formed on valve housing 144 (see FIG. 10). A compression spring 186 is engaged between the inner side of actuating arm 180 and the right-hand end of valve member 172. As best seen in FIG. 10, actuating arm 180 is of a generally U-shaped configuration when viewed from the top, one leg of the U-being mounted on pin 182 and the opposite leg of the U-being projected clear of the valve body at its opposite side and terminating in an enlarged actuator engaging bump 188.

Under normal conditions, air under pressure acting against the left-hand side of valve head 174 is sufficient to hold head 174 against its seat 160 and, through the action of spring 186, position arm 180 at its extreme limit of clockwise movement about pivot pin 182 as viewed in FIG. 10. During movement of the head assembly along its path, actuator arm 180 is at the front or leading side of the assembly with respect to its direction of movement with the bump 188 on the arm projecting out to one side of the path. Upon engagement of bump 188 with either a stationary cam on the machine frame or by actuating element of a reject system to be described below, the engagement pivots arm 180 in a counterclockwise direction about pivot pin 182 through spring 186 to shift valve member 172 to the position shown in FIG. 6. Spring 186 is quite stiff and does not normally compress during valve shifting However, the spring can give when the valve is seated to permit overtravel.

Valve 70 is held against rotation with shaft 66 by an upwardly projecting finger 190 bolted at its lower end as by bolts 192 to a projection 194 on upper coupling bushing 62. The upper end of finger 190 is slidably received within a complementary slot 196 formed on housing 144. The sidewalls of slot 196 engage the upper end of finger 190 to hold valve body 144 against rotation with shaft 66.

Vertical rods 60 which link head assemblies 50 into an endless chain are supported and guided for movement relative to the machine frame along a fixed path by structure to be described below. In picking up containers from conveyor 32 and depositing the containers on assembly machine 34, it is necessary for the head assemblies to move up and down in a vertical direction relative to the fixed path of rods 60. Bushings 54, 56 and 58 enable head assembly 50 to slide up and down on rods 60. Vertical positioning of head assemblies 50 along rods 60 is accomplished by a support roller 198 rotatably mounted on bracket 52 for rotation about a horizontal axis, roller 198 being supported upon a track 200 fixedly mounted on the machine frame and provided with appropriate inclined and flat sections to be discussed below.

As explained above, when the head assemblies 50 are assembled into an endless chain, a series of vertical rods 60 are employed, each rod passing through the front coupling bushings 54 and 56 of one head assembly and also through the rear coupling bushing 58 of the next head assembly 50. Coupling bushing 58 is one of the floating type in which a bushing element 202 is slidably received between a pair of arms 204 formed on support bracket 52 so that bushing 202 can shift horizontally forward and backwards to accommodate a slight relative displacement between the adjacent head assemblies.

Vertical rods 60 of the endless chain are coupled to each other by upper and lower link assemblies 206 and 208 respectively. With two minor exceptions to be discussed below, upper and lower links 206 and 208 are identical, and thus only link 206 will be described in detail, it being understood that the description is equally applicable to lower link 208.

Link 208 is formed with a vertically extending central body portion 210 having integrally formed upper 212 and lower 214 front coupling bushings projected forwardly from body 210. Bushings 212 and 214 are vertically spaced from each other, and a rear coupling bushing 216 is formed centrally on the rear of body 210. A roller 218 is rotatably mounted in link body 210 for rotation about a vertical axis, while a support roller 220 is mounted in body 210 for rotation about a horizontal axis near the upper end of body 210.

Link 208 is identical in structure to link 206, except that link 208 does not have a support roller 220 and link 208 is mounted upon rods 60 in an upsidedown relationship relative to upper link 206.

Links 206 and 208 couple rods 60 to each other into an endless chain, each rod 60 passing through the front coupling bushings of one link and the rear coupling bushing of an adjacent link, the rear coupling bushing of one link projecting between the front coupling bushings fo the next link.

The front coupling bushings of each link 206 and 208 are fixedly secured to the vertical rod 60 as by bolts 222 which pass radially through one of the front bushings into tapped bores in rod 60. The rear coupling bushings are freely rotatable on rods 60. Pairs of guide rollers 224 and 226 are rotatably mounted at the upper and lower ends respectively of each rod 60.

Figure 2:
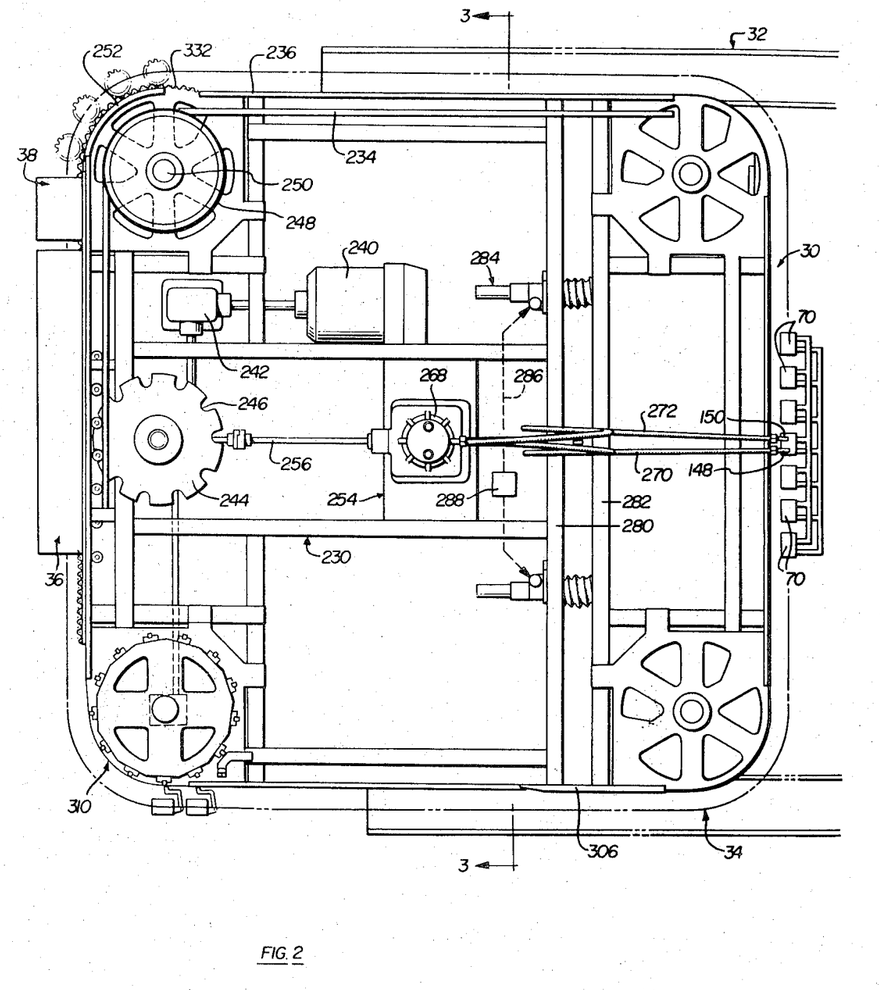
FIG. 2 is a top plan view of the container handling apparatus of the present invention with certain parts broken away or omitted for the sake of clarity.
Figure 3:
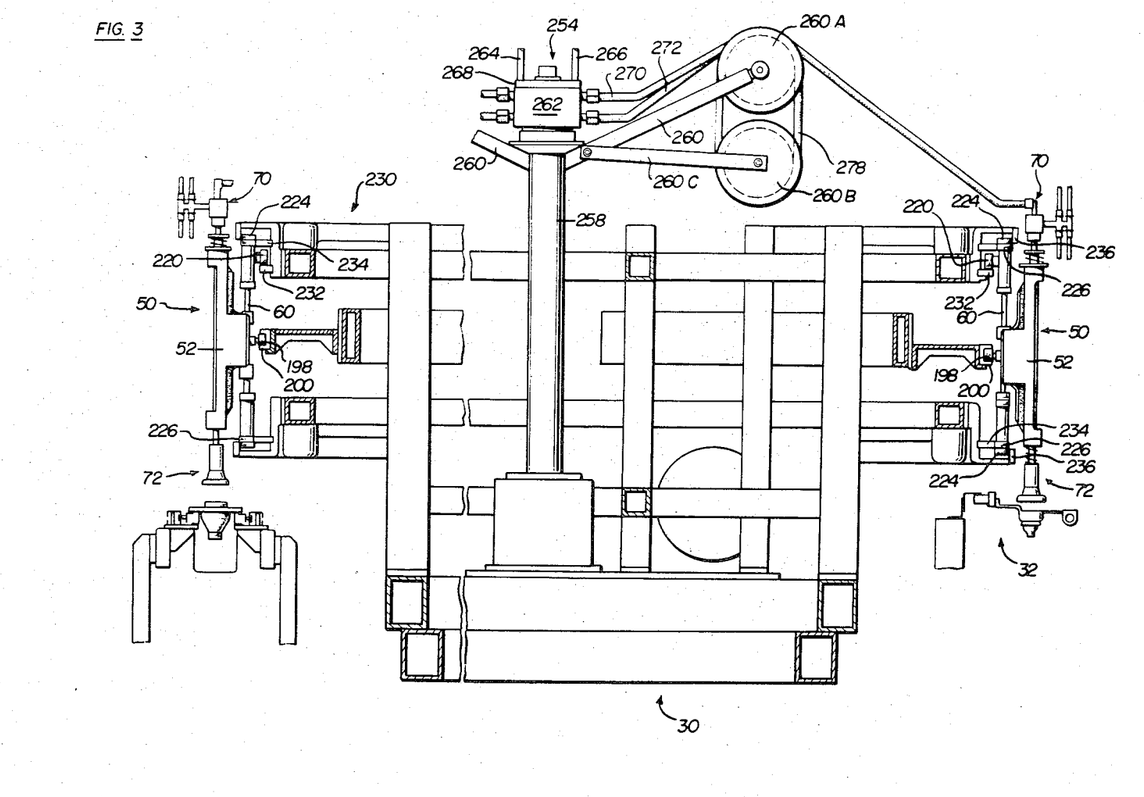
FIG. 3 is a cross-sectional view of the apparatus taken approximately on line 3—3 of FIG. 2, again with various parts broken away or omitted.

Referring now to FIG. 3, the support rollers 220 and guide rollers 224 and 226 rotatably engage various tracks fixedly mounted upon the frame 230 of machine 30. Support rollers 220 of upper links 206 support rods 60 from a track 232 fixedly mounted upon the machine frame and extending along the entire periphery of the path of movement of the endless chain formed by the linked rods 60. Track 232 is horizontal throughout its entire extent and forms a horizontal reference plane from which vertical positioning of the individual head assemblies 50 can be measured. The paired sets of guide rollers 224 and 226 at the respective upper and lower ends of rods 60 engage inner and outer guide tracks 234 and 236 respectively. The configuration and structure of the inner and outer guide tracks 234 and 236 which engage and guide upper guide rollers 224 is identical to the corresponding set of lower tracks 234 and 236. Inner and outer tracks 234 and 236 define the configuration of the endless path of movement of the linked chain of rods 60, this path when viewed from above (see FIG. 2) being of generally rectangular shape having rounded corners. Tracks 232, 234 and 236 thus define a fixed and unvarying path of movement of rods 60 while rods 60 in turn support head assemblies 50 for vertical movement on the rods, under the control of roller 198 and its cam track 200.

MACHINE DRIVE AND PRESSURE DRIVE

Referring first to FIG. 2, the endless chain of linked head assemblies 50 is driven in movement along the path defined by the roller and track system described above in a counterclockwise direction as viewed in FIG. 2. A main drive motor 240 is coupled through a suitable gear reduction and drive train designated generally 242 to drive a main drive wheel 244 in rotation about a vertical axis at a location midway along one side of the endless path of movement of head assemblies 50. Drive wheel 244 is essentially a wheel formed with recesses 246 shaped to mesh with and drivingly engage the rollers 218 and 226 of links 206 and 208.

At each corner of the endless path, inner guide rails 234 move into tangential relationship with an idler wheel 248 mounted in the machine frame for free rotation about a vertical axis established by a guide wheel shaft 250. Outer guide tracks 236 are continued around the corners of the path by curved sections 252 fixedly mounted upon the machine frame. Two idler wheels 248 are mounted on each shaft 250, an upper and a lower wheel for engagement with the upper and lower guide rollers 226.

Vacuum and air pressure are supplied to each of the valves 70 on head assemblies 50 from a centrally located rotating carousel 254 which is driven in rotation about a vertical axis centrally located with respect to the path of movement of assemblies 50 by a coupling shaft 256 which is driven in turn from the main drive train 242. As best seen in FIG. 3, carousel 254 includes a rotating central vertical shaft 258 having a plurality of radially projecting arms 260 fixedly mounted upon shaft 258 near its upper end. At its upper end, shaft 258 carries an air-vacuum distributor 262 which rotates with the shaft. Air under pressure is let into distributor 262 from a pressure line 264, while vacuum is supplied to the distributor by a second conduit 266. Conduits 264 and 266 are connected into a stationary plate 268 mounted at the top of distributor 262 and the two conduits remain stationary while distributor 262 rotates beneath it, a rotary seal being maintained between the tip plate 268 and the main body of rotating distributor 262. Flexible air pressure lines 270 and vacuum lines 272 are coupled to the rotating distributor and formed into a loop 278 which is supported at the outer end of each arm 260.

Referring now to FIG. 2, conduits 270 and 272 are grouped in pairs at distributor 268 and are led, via loops 278 into the main pressure and vacuum ports 148 and 150 of a valve 70. To minimize the number of conduits 270 and 272, the auxiliary ports of a group of valves 70 are commonly connected to each other by manifolds 274 and 276, manifold 274 being connected to the auxiliary ports 150a of the group of valves, while manifold 276 commonly connects all of the auxiliary pressure ports 148a of this group of valves. The main ports 148 and 150 of those valves 70 of a group which are not connected directly to conduits 270 and 272 are plugged. Only one such group of valves has been shown in FIG. 2 for the sake of clarity.

Because of the generally rectangular shape of the path followed by the valves, the conduits 270 and 272 must extend and contract, since the radial distance from distributor 268 to a corner of the endless path is greater than the distance between distributor 268 and a location midway along one side of the path. Loops 278 accommodate this variation in distance and also relative movement between the opposite ends of the conduits due to the fact that distributor 262 rotates at a constant speed in a circular path, while valves 70 move at a constant speed along a non-circular path. The conduit loops 278 are reeved about upper and lower pulleys 260A and 260B respectively. Pulley 260A is rotatably supported at the outer forked end of a rigid arm 260, and pulley 260B is rotatably supported at the outer forked end of a member 260C privotally mounted on arm 260 so that lower pulley 260B floats and provides a counter weight keeping loop 278 taut at all times.

In order to accurately regulate the tension in the endless chain of head assemblies 50, machine frame 230 is constructed in two sections 280 and 282. Frame section 280 is stationary and fixedly mounted in position upon a sub base, while frame section 282 is mounted upon frame section 280 for movement to frame section 280 from left to right as viewed in FIG. 2. Moveable frame section 282 may be shifted upon stationary frame section 280 by two or more worm-driven screw assemblies designated generally 284 so frame 230 can be elevated or lowered for different bottle heights. The driving elements of the screw assemblies 284 are mechanically linked as by a coupling schematically indicated at 286 to a common drive element schematically shown at 288. The purpose of common drive element 288 and the mechanical coupling 286 is to assure that frame section 282 remains in accurate parallelism with frame section 280 during adjustment.

As explained above, the vertical rods 60 which link the head assemblies 50 to each other in an endless chain are supported and guided in movement along a path determined by the engagement between support roller 220, which rides on track 232 to establish the elevation of rod 60 and the upper and lower pairs of guide rollers 224 and 226 which engage upper and lower pairs of guide rails 234 and 236 to establish the location of the path of rods 60 horizontally. Support roller track 232 lies in a horizontal general plane, and thus vertical rods 60 stay at a constant elevation throughout their movement around the endless path. Head assemblies 50, however, are slidably supported upon rods 60 and are moved vertically up and down along the rods at certain locations along the endless path. The vertical position of head assemblies 50 is established by the engagement between support roller 198 mounted upon the head assembly and its tract 200. Track 200 generally is located at a fixed elevation except during those portions of its path which extend along conveyor 32 and assembly machine 34, at which locations track 200 dips downwardly to lower chucks 72 into operative relationship with conveyor 32 or assembly machine 34 during the pick-up of containers from conveyor 32 and the discharging of containers onto assembly machine 34. The configuration of track 200 at these two locations is shown schematically in FIGS. 7 and 8.

Figure 7:
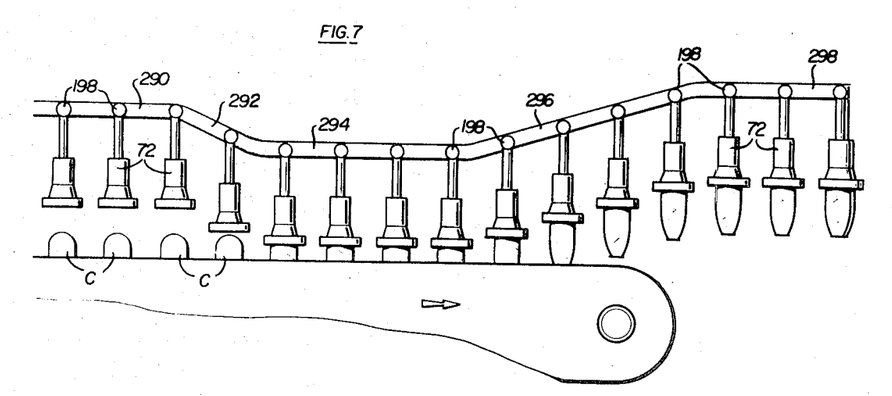
FIG. 7 is a schematic view illustrating the manner in which containers are picked up or loaded onto the apparatus.

Referring first to FIG. 7, as the heads 50 move around a corner of the endless path onto the run overlying conveyor 32, track 200 is at its normal elevation as at 290, and as heads 50 move onto this run, their chucks 72 are supported, by the engagement of their guide wheel 198 in track 200, at an elevation well clear of containers C moving along conveyor 32 from left to right as viewed in FIG. 7. Movement of chucks 72 is synchronized with the movement of containers C along conveyor 32 so that as each chuck moves along section 290 of track 200, the chuck is in vertical alignment with a container C on conveyor 32 and is maintained in this vertical alignment. Track section 290 merges into a downwardly inclined section 292 and, as the support rollers 198 of the respective heads 50 move along downwardly inclined section 292, chucks 72 move downwardly toward the respective containers. At the lower end of downwardly inclined section 292, track 200 is formed with a horizontal section 294 located at an elevation relative to conveyor 32 such that chucks 72 are sealed to, but not quite fully seated upon containers on conveyor 32 in the position shown in FIG. 5.

It will be recalled from the preceding description of the chucks that the control valves 70 are normally maintained in their normal condition at all locations shown in FIG. 7. However, valve head 100 closes the lower end of the vacuum supply passage within the chuck 72 until, as the chuck is carried onto and along horizontal track section 294, the container engages the lower end of stem 102 on valve head 100 (FIG. 5) to lift the valve and admit vacuum into the chuck. Thus, as the chuck 72 moves along track section 294, vacuum is applied to the chuck to cause the chuck to operatively grip the container. The application of vacuum to the interior of the chuck sucks the container bottom up onto the seat. At the right-hand end of track section 294, it merges with an upwardly inclined track section 296 which elevates the chucks 72, thus lifting the gripped containers upwardly clear of conveyor 32. As the chucks approach the corner of their endless path at which they leave conveyor 32, track 200 is at its maximum elevation at section 298, with the suspended containers well clear above conveyor 32.

Figure 8:
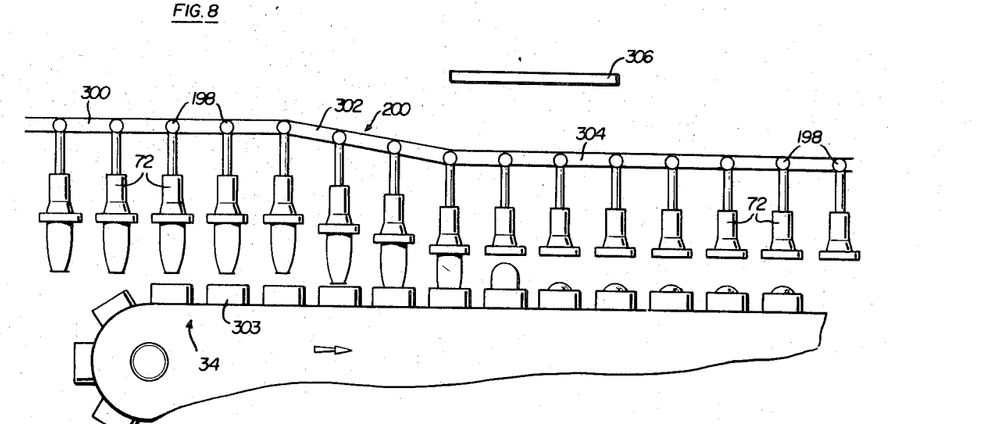
FIG. 8 is a schematic view showing the manner in which the containers are normally transferred from the apparatus of the present invention to the assembly machine.
Figure 9:
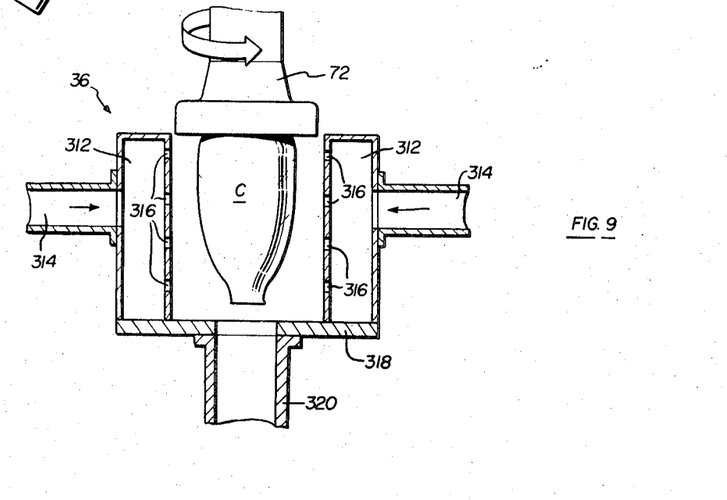
FIG. 9 is a simplified cross-sectional view of the spray tunnel.

Track 200 is maintained at its maximum elevation as the chucks move along that side of their path extending between conveyor 32 and assembly machine 34. Referring now to FIG. 8, as the chucks move around the next corner of the path into overlying relationship with assembly machine 34, their guide rollers 198 move along a level section 300 of track 200 which supports chucks 72 at a position such that their suspended container is well clear of assembly machine 34. Again, assembly machine 34 is synchronized with the movement of chuck 72 such that the suspended containers are moved into vertical alignment with container receiving pockets 303 carried on conveyor 34 and moving from left to right as viewed in FIG. 8. As the guide rollers of the respective chucks move from left to right as viewed in FIG. 8, they pass along a downwardly inclined track section 302 which causes the chucks 72 to be lowered downwardly to partially insert the suspended container into the aligned pocket 303 on assembly machine 34. Downwardly inclined section 302 merges with a horizontal discharge section 304 of track 200 along which the containers are discharged from the chucks into the respective pockets.

The discharging of the containers is accomplished by a stationary valve actuating cam 306, located above and generally coextensive with discharge section 304 at a position such that cam 306 engages and depresses the valve actuating arms 180 of the control valves 70 associated with the respective chucks. The engagement between cam 306 and valve actuating arms 180 shifts the connections within valve 70 to disconnect chuck 72 from the vacuum source and simultaneously connect the air pressure source to the chucks to eject the containers from the chuck 72 into the pocket 303 on assembly machine 34. The elevation of discharge section 304 relative to the path of movement of pockets 303 is such that chucks 72 have vertical clearance above the containers after they have been ejected and seated in pockets 303. After passing discharge section 304 of the track 200, the chucks are at their normal elevation — i. e., the same elevation as 290 (FIG. 7).

Having described one embodiment of our invention, We claim:

1. In a container handling apparatus for handling containers having hemispherical bottoms; container chuck means comprising a hollow annular housing having an open recess at one end and having an inlet passage extending axially from said recess through the opposite end of said housing, means in said recess at said one end of said housing defining an annular seat adapted to engage the hemispherical bottom of a container to locate the container in coaxial relationship with said housing with the container bottom projecting a predetermined distance into said recess, a flexible annular seal member mounted in said housing in coaxial relationship with said seat and located to sealingly engage the bottom of a container before the container engages said seat and to maintain the sealing engagement with the container bottom when the container bottom is engaged with said annular seat, valve means in said inlet passage having a valve seat within said inlet passage facing away from said recess of said housing, a valve head slidably mounted in said inlet passage for movement into and out of engagement with said valve seat and operable, when engaged on said valve seat, to block communication between said inlet passage and recess, means in said inlet passage normally biasing said valve head against said valve seat, a stem on said valve head projecting from said inlet passage into said recess and operable when engaged by the bottom of a container engaged by said annular seal to disengage said valve head from said valve seat to thereby place said inlet passage in communication with said recess, a source of vacuum and a source of air under pressure, a hollow shaft coaxially and fixedly mounted upon said opposite end of said housing with the interior of said hollow shaft in direct communication with said inlet passage, control valve means mounted upon the end of said shaft remote from said housing and connected to said source of vacuum and said source of air under pressure, said control valve means being operable in a first position to connect the interior of said shaft to said source of vacuum, and being operable in a second position to connect the interior of said shaft to said source of air under pressure means normally maintaining said control valve means in said first position, conveying means for supporting and driving said chuck means along an endless path, a control valve means actuator mounted upon said control valve means and operable when depressed to shift said control valve means to said second position, and cam means mounted alongside said endless path and operable to depress said actuator as said actuator is moved past said cam means.

2. The invention defined in claim 1 wherein said cam means comprises a cam member fixedly mounted at a container discharge station on said endless path to depress said actuator each time said actuator is moved past said cam means.

3. The invention as defined in claim 1 wherein said conveying means comprises support means mounting said shaft upon said conveying means for axial and rotary movement relative to said support means, means for shifting said shaft axially relative to said support means at selected locations along said endless path, and means for rotating said shaft during at least a portion of its movement along said endless path.

4. The invention as defined in claim 3 further comprising means sealingly mounting said control valve means for rotation relative to said shaft, and means engageable between said support means and said control valve means for accommodating axial movement of said control valve means relative to said support means and for holding said control valve means against rotation relative to said support means during rotation of said shaft.

5. The invention defined in claim 1 comprising a plurality of said chuck means, means linking said plurality of chuck means to each other into an endless chain with the axes of said housing disposed in spaced parallel side by side relationship with each other, chuck conveying means for supporting and driving the linked chuck means in movement along an endless path, first conveying means for feeding inverted containers in spaced succession corresponding to the spacing between adjacent housing axes along a first path underlying and vertically aligned with a first portion of said endless path, second conveying means for conveying a series of container receiving pockets spaced from each other in correspondence to the spacing between adjacent housing axes along a second path underlying and vertically aligned with a second portion of said endless path, means on said chuck conveying means operable during movement of said chuck means along said first portion of said path to lower the chuck means into engagement with a container on said first conveying means and to subsequently elevate said chuck means, means normally maintaining said control valve means in said first position whereby said chuck means is operable to pick up and remove a container from said first conveyor means during transit of said first portion of said path, and means operable during the transit of said chuck means of said second portion of said path for operating said control valve means to connect said inlet passage to said source of air under pressure to thereby eject the container from the chuck means into a container receiving pocket on said second conveyor.

6. Container handling apparatus comprising a frame, link means mounted upon said frame for movement along an endless generally rectangular horizontal path, a plurality of container handling head assemblies mounted upon said link means for movement therewith and for vertical reciprocatory movement relative to said link means, head positioning means on said frame for vertically positioning said head in accordance with the location of said head upon said endless path, a vacuum actuated air pressure released container chuck at the lower end of each head assembly, valve means at the upper end of each of said head assemblies for controlling the supply of air or vacuum to the associated chuck to thereby control operation of said chuck, a carousel mounted for rotation at a location centrally of said rectangular path, a source of air under pressure and a source of vacuum connected to said carousel, first conduit means connected to said source of air at said carousel and extending from said carousel to said valve means, second conduit means connected to said vacuum source at said carousel and extending from said carousel to said valve means, pulley means on said carousel for maintaining a variable sized loop in said first and said second conduit means to maintain said conduit means taut while accommodating for the variable distance between said carousel and various points on said rectangular path, and means on said frame engageable with said valve means for controlling actuation of said valve means at selected points along said path.

7. Apparatus as defined in claim 6 wherein said first conduit means comprises a first manifold commonly connecting a group of said valve means to a single first conduit extending from said manifold to said carousel, and said second conduit means include a second manifold commonly connecting the valve means of said group to a single second conduit extending from said manifold to said carousel, said pulley means being engageable with said single conduits.

* * * * *